Patented Mar. 9, 1943

2,313,107

UNITED STATES PATENT OFFICE 2,313,107

COMPOSITION FOR DENSIFYING POROUS MASSES AND STRUCTURES

Louis S. Wertz, Shaker Heights, Ohio

No Drawing. Application June 20, 1939,
Serial No. 280,141

11 Claims. (Cl. 106—91)

The present invention relates to a composition of fluid material with solids in suspension, which, under the action of pressure, may be forced into the void spaces of porous materials, such as concrete and masonry structures, and to a process of repairing such structures with this material so as to render them serviceable as regards strength and water-tightness, and so as to render them resistant to the action of frost and to the action of corrosive waters.

It is an object of this invention to provide an improved composition which may be readily made to flow under pressure for long distances through small channels in porous or honeycombed materials such as concrete or masonry structures, which will harden without appreciable shrinkage, and which, when hardened, will possess properties of rigidity, strength and impermeability equal to that of structures made from Portland cement mortar or concrete mixes under the most favorable conditions.

Another object of this invention is to provide a process of densifying and solidifying concrete and masonry structures which comprises forcing, under pressure, a fluid composition through channels, crevices, cracks and the like, so as to substantially fill all void spaces within the mass with a homogeneous mixture of materials of pastelike consistency which will harden to form an integral part of the structure.

It is a matter of common observation that many concrete and masonry structures, such as dams, bridges, walls, tunnel linings, and the like, exhibit internal imperfections which render them unsuitable for the services they were designed to perform. These imperfections are due to a variety of causes, such as poor workmanship at the time the structure was built, to the dissolution of soluble compounds by percolating waters, and to the disruptive action of frost. Regardless of the cause, the imperfections take the form of cracks, crevices, honeycomb, and a general lack of density and solidarity, rendering the structure deficient as regards water-tightness and strength.

In the past, attempts have been made to repair such structures by drilling holes to the interior and forcing into these holes a thin mortar, slurry, or grout, comprising a mixture of Portland cement and water. The examination of cores taken from structures thus treated has disclosed that this method of repair is ineffective in filling the smaller voids, that such mixtures can be forced only for very short distances through small channels before plugging occurs, and that in larger voids there occurs a settlement of the cement, and a consequent rise of water to the top of the void space before hardening, and a shrinkage of the volume of slurry as setting and hardening takes place, as a consequence of which the material within the void space is lacking in homogeneity, the space is incompletely filled with hardened cement paste, and there is a lack of bond or adhesion between the hardened paste and the concrete or stone surrounding the void.

It is, therefore, an object of this invention to provide an improved composition for densifying and solidifying concrete structures which will readily flow under pressure into the voids and cracks of a porous or honeycombed concrete mass.

Another object of this invention is to provide a suitable composition which will have high flowability, to minimize pressure losses due to friction, which can be easily forced into the concrete structure, in which the cement and other solid materials remain uniformly distributed in the mix until solidification takes place, which will have very little shrinkage upon setting, and which, when set or hard, has comparable strength with the surrounding structure.

Another object of this invention is to provide a process of densifying and solidifying concrete structures wherein the voids, cracks, crevices, and the like, may be substantially filled without separation of the material, and the composition may be set and firmly adhere to the existing concrete structure.

When large dams are constructed it has frequently been found that deleterious seepage around the dam frequently occurs to a depth of 100 or 200 feet below its base. To reduce this seepage it has been customary to force at high pressure, such as 1000 lbs. per sq. in., a very thin, watery slurry of Portland cement into the earth at the base of the dam. This thin slurry is then followed with a thicker material to solidify the earth.

The high pressure initially used causes relatively large channels to open in the direction of least resistance to flow, and the solidifying material which is later forced into the opening follows these channels without entering the great mass of voids. The desired solidification of the dam foundation is, therefore, not obtained.

It is, therefore, an important object of this invention to provide a process and composition for densifying earth, gravel, and rock strata wherein the voids are filled, in order to render them more suitable for foundations of dams, buildings, and the like.

It has been found that the tendency of Portland cement slurries to plug channels many times the size of the largest cement grains is due to several causes, among which are the flocculation or agglomeration of small particles of cement to form clusters or clumps, the rapid hydration of the smaller particles of cement to form a viscous gel, the particle interference or frictional resistance to the sliding of one particle over another, and the lack of water-retaining capacity of the slurry. This latter property is commonly referred to as bleeding.

All Portland cements contain compounds of lime, silica, iron, and aluminum. When water is added to Portland cement, hydration begins, and during the early stages of hydration, known as "setting," precipitation of aluminum and calcium hydroxide occurs to some extent. The charge of the metallic cations of these precipitated hydroxides is positive, while the charge on the unhydrated basic cement particles is negative. There is, therefore, a natural tendency in Portland cement for the precipitated hydroxide to cause flocculation of the suspended cement particles.

Since the concentration of aluminum ions is for the first few hours relatively larger than that of other compounds, and since, in the compounds of aluminum, the metallic ions are relatively highly charged, the aluminum may be considered as the most powerful factor in causing agglomeration of the cement particles in a slurry.

Aluminum hydroxide or the hydrous oxide of aluminum is very hydrophilic, rapidly combining with large quantities of water to form a viscous gel which produces great increases in viscosity or decrease in the mobility of the slurry. This phenomenon is commonly referred to as the setting of the cement.

I have found that the formation of the gels, or the early stiffening of the slurry, may be materially retarded by adding a quantity of acidic colloidal silica or pozzolanic material. Being in a finely divided state, the particles also act to physically separate and to maintain in suspension the particles of cement, and to prevent the agglomeration of the cement grains. The pozzolana or finely divided siliceous materials thus act under certain conditions as a protective colloid. The acidic colloidal silica or colloidal material which produces some silicic acid may be added in various finely divided forms of the complex mineral silicates, such as are present in blast furnace slag, fly ash, and certain natural siliceous materials generally classified as pozzolana, forming compounds having considerable cementitious value with the lime that may be liberated as a byproduct during the setting of the cement. Some types of blast furnace slag are hydraulically active in themselves and are very desirable.

In addition to retarding the formation of the gel, such silicates are advantageous, in that the acidic colloidal silica in these materials slowly combines with the active calcium hydroxide which is liberated during the process of hydration of Portland cement to produce insoluble calcium silicate that contributes to both strength and the impermeability of the hardened cement composition. Moreover, such materials act as fillers and reduce the volumetric shrinkage that takes place during the setting or hardening of the slurry.

A Portland cement slurry containing a filler that is pozzolanic, or that has acidic colloidal silica, may be further improved as a material for solidifying concrete structures by the addition of an agent or agents to form a stable suspension of the cement and filling material in water, and to act as a lubricant to facilitate the pumping and flowing of the material into place.

Agents that are generally satisfactory for plasticizing and lubricating the cement slurry are oleaginous materials, including fatty acid glycerides, the fatty acids themselves, and salts and esters thereof, and, in particular, the stearates and oleates. Although a number of agents of this class may form insoluble soaps with lime, it appears that the liberation of lime from the cement mix is so slow that only a very small amount of such insoluble soaps would be formed during the placement of the cement slurry. The esters and salts of the fatty acids apparently, however, hydrolize in the aqueous mixture so that the fatty acid constituent assists in forming and maintaining the suspension of the solids and also provides lubrication between the particles.

Other agents may be used to aid in maintaining a stable suspension and to assist flow of the cement slurry including the solids of the pozzolanic type. Some of them are powerful in forming the suspension and a very small quantity is required; others are more important to maintain the solid materials in suspended condition. Such agents generally have an adverse effect on the strength of the hardened cement composition when used in substantial quantities. However, with small amounts, a substantial increase in the stability of the slurry may be obtained without a substantial decrease in strength. Agents of this type include stabilizing agents, such as the alginates, gelatin, glue, casein, bentonites, gum tragacanth, and the like. The more powerful wetting agents, as the alkylated sulphonated aromatic compounds and salts thereof, or compounds which are obtained by condensing formaldehyde with a polynuclear aromatic sulfonic acid or lignin sulfonic acids or derivatives thereof may be used, but they should be used in very small quantities.

The quantity of agent to be added to the slurry depends upon the type used. The agents that are generally satisfactory for plasticizing and lubricating the cement slurry, such as the oleaginous materials, and particularly the alkali stearates and oleates, may be used advantageously in quantities up to 1% or 2% by weight of the Portland cement. However, when agents of the wetting or emulsifying type, such as the sulphonates, higher alcohols, sulphonic acid derivatives, etc., mentioned above, which do not generally precipitate in the cement slurry, are used, only a small quantity of such agents should be used, such as about .1% to .3% or so, by weight of the cement.

However, if an agent of the plasticizing and lubricating type, such as the oleaginous materials, and also one of the agents having a more powerful effect in producing a stable suspension, be used, a less quantity of the oleaginous material is usually preferred.

The quantity of finely divided silicious material or acidic colloidal silica used will depend upon the character and qualities desired in the resulting slurry and hardened cement. Usually the silicious material and Portland cement may be used advantageously in about equal proportions. Depending upon the type of silicious material used and the properties desired in the slurry, the above proportion can be varied considerably.

The silicious material may vary from an amount equal to half the Portland cement used to an amount twice that of the Portland cement. When using water-quenched blast furnace slag, optimum results are usually obtained when the proportion of slag to cement is 1:1 or 1½:1.

The fluidity or the ability of a cement mixture to be pumped through fine openings without clogging them is increased by the addition of protective colloids, such as the alginates, gelatin, glue, casein, bentonites, gum tragacanth, and the like, which have a stabilizing effect on the mixture, permitting the production of more stable suspension having relatively high fluidity. The use of the hereinbefore mentioned materials containing acidic colloidal silica, such as finely ground shales, blast furnace slag, etc., is preferred, since, in addition to their action as protective colloids in maintaining the stability of the slurry, they retard the set and provide some additional strength in the hardened material. A very small percentage of one of the more powerful wetting agents may be advantageously used in addition to the finely ground solids, to obtain increased stability of the slurry.

When the interstices in a concrete structure are small it is preferable that the material be pulverized sufficiently so that all of it will pass through a 100-mesh screen. For example, excellent results have been achieved with a mixture having 1 part of Portland cement and 1½ parts of granulated water-quenched blast furnace slag which has been pulverized to a sufficient fineness to pass through a 100-mesh screen, and which has a surface area of at least about 2,200 sq. cm. per gram. To this mixture there is added 12 to 15 gallons of water per sack of cement and a sufficient quantity of an emulsion containing an alkali salt of stearic acid to furnish 1 to 1½ lbs. of stearate per sack of cement. Good results have been achieved by using equal parts of Portland cement and fly ash of low carbon content, for which the fineness, as measured in terms of surface area, has varied from 2,500 to 3,500 sq. cm. or more per gram.

A suitable quantity of any chemically active silicious material of volcanic or diatomaceous origin, such as volcanic ash, tuff, diatomaceous earth and shale, or other material having similar properties, may be substituted for blast furnace slag with good results in the above example. These materials may be either added to the cement clinker and ground with the cement or separately added to the cement in a finely divided form.

While any commercial Portland cement can be employed, it has been found that best results are achieved with a cement that is fairly low in the compound tricalcium aluminate and a cement of such fineness that the surface area will be in the neighborhood of 1,600 to 1,800 or more sq. cm. per gram with all particles passing a screen of 100 meshes to the inch and a relatively small percentage of particles having a mean diameter of less than 5 microns.

It will thus be seen that the cement slurry should have included in its ingredients, in addition to the cement and water, ingredients which have the properties of forming and maintaining a stable suspension of the solids in the water, retarding the set of the cement, and lubricating or increasing the flowability of the slurry through voids and interstices of a structure or mass. Certain of the ingredients of the slurry may perform more than one of these functions such as the finely ground blast furnace slag, shale, etc., which aid in forming and maintaining a stable suspension by acting as protective colloids for the cement as well as tending to retard the gelation of the cement. By varying the proportions of the ingredients and using care in the selection of them, a cement slurry can be made up which will have the desired stability of suspension, the desired flowability, and will not gel until the material has been forced into the finest cracks and interstices of the structure or mass being solidified.

It has been found that a concrete or masonry structure which is internally defective as regards the presence of cracks, cavities, and large or small void spaces in general, may be economically and efficiently repaired so that it is substantially free from such imperfections by the use of properly proportioned mixtures of Portland cement, chemically active, finely divided silicious materials, such as those previously named, and wetting, plasticizing, lubricating or dispersing agents, such as those previously mentioned, together with water sufficient to produce a slurry, grout, or paste of the required consistency. The composition may be forced for long distances through voids and channels with a minimum of frictional resistance. It will retain its fluidity and mobility for an hour or more, and the solids will remain in suspension without tendency towards flocculation or agglomeration, or without appreciable settlement. The composition hardens without appreciable shrinkage or water gain, and, when hardened, is impervious, tenaciously bonds to its surroundings, and is of high tensile and compressive strength.

Briefly, an illustration of the process of repair is as follows:

A plurality of holes are formed, as by drilling, in the surface of the concrete or masonry mass to a predetermined level, and according to a predetermined pattern. The holes may be washed with water to flush out loose materials from the voids and pockets of the porous interior of the concrete or masonry mass, and air under pressure may be supplied to the holes to displace the water or other washing liquid.

The composition is next supplied to the holes under pressure to force it into all the interstices, voids, fissures, etc., in the region of the concrete or masonry adjacent the holes. The pressure is maintained, as by continuing the pumping after substantial flow of the material ceases, and the composition is allowed to set under pressure for a period of time before the pressure is released, so that it will enter the finer voids and remain in place, and become firmly bonded to the existing concrete of the structure. If the concrete or masonry structure is of such a thickness that the voids and interstices cannot be thoroughly filled at the depth level of the holes, the holes may be drilled to a further depth level through a portion of the structure just treated, where the process steps of flushing, filling, allowing the repair material to set, and drilling may be repeated as many times as desirable or necessary in order to solidify or densify the concrete structure. When it is desirable to carry the filling process to further than a single depth, the filling operation is preferably done at depth increments of about two or three feet, and the composition may be supplied to the holes by air pressure, or under pressure by a suitable pump.

After the interior of the structure has been densified and solidified, it may be desirable that the surface of the structure be treated by a process which will render it impervious, so that deleterious substances, such as moisture, cannot gain access to the interior of the structure and cause deterioration or disintegration thereof. Such a process is one in which a suitable weatherproofing composition is applied to the surface of the structure in any suitable manner and is thoroughly worked into the surface. It has been found that when a weatherproofing composition is applied under pressure, and simultaneously worked into the concrete by means of an abrasive, as an annular power-driven carborundum wheel, all surface projections are removed and all surface voids are filled, thereby providing a structure having a smooth surface of uniform color which is, in itself, dense and durable to an appreciable thickness.

In the solidification of earth, rock and gravel strata, such as are present at dam and building sites, a properly proportioned mixture of Portland cement, chemically active, finely divided silicious materials such as those previously named, sufficient water to make a slurry, and preferably with one or more of the above mentioned plasticizing or lubricating agents is used in the same manner as in the case of the solidification of other porous structures such as concrete or masonry. The composition may be forced through long distances through voids or channels in the rock, gravel and earth strata, with a minimum of frictional resistance, so that cracks and crevices which may provide passages for the seepage of water under the dam, etc., are effectively sealed.

When it is desired to densify and solidify these earth, rock, or gravel strata, holes are drilled to a predetermined depth, usually about 50 feet or so, and the material forced into the holes under positive pressure which may be as high as 500 or 1000 lbs. per square inch. Usually a pressure of about 300 or 400 lbs. per square inch is used, and the pressure is maintained on the cement for a considerable time to allow it to flow into the smaller voids as well as the larger ones and to allow the slurry to set under pressure. After solidifying the material at one level, holes may be drilled through the solidified material to a greater depth, etc., until the foundation material is solidified to a depth of 200 or 300 feet if desired. Because the pressure used is usually insufficient to open a channel in the foundation, and because the mixture used does not readily clog the voids, the desired solidification of voids of all sizes occurs.

This invention is a continuation in part of my application Serial No. 194,933, filed March 9, 1938. It is to be understood that the particular form of the invention shown and described, and the particular procedure set forth, are presented for purposes of explanation and illustration, and that various modifications may be made without departing from the spirit of my invention.

What I claim is:

1. A slurry for filling the fine voids and interstices of porous masses of earth, rock masonry, concrete and the like, comprising Portland cement and a filler having sufficient acidic colloidal silica to retard the gelling of the cement, a relatively small amount of a lubricating and plasticizing agent, and a relatively small amount of a protective colloid, said slurry being relatively fluid and stable, whereby it may be forced through voids and interstices of a masonry or concrete structure.

2. A slurry for filling the voids and interstices of porous masses of earth, rock, masonry, concrete and the like, which comprises Portland cement, a lubricating material, a finely divided filling material containing acidic colloidal silica in suspension, and a protective colloid, said finely divided filling material being present in said slurry in an amount from about one to two times the amount of the cement by weight, said lubricating material being present in an amount up to about 2% of the weight of the cement, all the materials of said slurry being sufficiently fine to pass through a 100-mesh screen.

3. A composition for filling the fine voids and interstices of porous masses of earth, rock, masonry, concrete and the like, comprising a finely divided filling material containing sufficient acidic colloidal silica to retard gellation of the composition, Portland cement, water, and a relatively small amount of at least one plasticizing and lubricating material to maintain the filler and cement in suspension and to increase flowability, said composition being characterized by its ability to flow under pressure through fine voids and interstices of a porous mass without separation of the ingredients and before gellation of the cement commences.

4. A composition for filling fine voids and interstices of porous masses of earth, rock, masonry, concrete and the like, which comprises a material containing acidic colloidal silica, Portland cement, and a relatively small amount of lubricating agent, said material being present in an amount of from about one-half to about twice the amount of the cement by weight, said composition when mixed with water forming a homogeneous, stable suspension having high flowability and plasticity to permit its penetration through fine voids and interstices of a porous mass.

5. A highly flowable and plastic composition which comprises an aqueous Portland cement slurry having incorporated therein a filling material containing acidic colloidal silica and a relatively small amount in proportion to the weight of the cement and filling material of an oleaginous material, said filling material being present in an amount by weight of more than approximately half the weight of the cement, said oleaginous material being present in an amount up to 2% of the weight of the cement, said composition being in the form of a stable, homogeneous suspension, containing no ingredients subversive to high flowability, and being characterized by its high capacity to penetrate for relatively great distances through fine voids and interstices.

6. The process of increasing the plasticity and flowability of Portland cement slurry which comprises incorporating in the slurry a finely divided material containing acidic colloidal silica in an amount of from about one-half to about twice the amount of cement by weight and up to about 2% of at least one oleaginous material, and mixing the slurry to obtain a homogeneous, stable suspension of the solid ingredients which is capable of penetration through fine voids and interstices without separation or settling.

7. A composition for filling fine voids and interstices of porous masses of earth, rock masonry, concrete and the like, comprising Portland cement, a filler containing substantial amounts of acidic colloidal silica to retard the gellation of the cement and a lubricating agent, said filling material being present in an amount of about one-half to about twice the amount of the weight of the cement, said lubricating agent being present in an amount up to about 2% of the weight of the cement, said composition containing no ingredients subversive to high flowability and when mixed with water being capable of flowing under pressure through small voids and interstices without separation or settling.

8. A composition for filling fine voids and interstices of porous masses of earth, rock, masonry, concrete and the like, comprising Portland cement, a finely divided, chemically active siliceous material containing substantial amounts of acidic colloidal silica to retard the gellation of the cement and a lubricating agent, said filling material being present in an amount of about one-half to about twice the amount of the weight of the cement, said lubricating agent being present in an amount up to about 2% of the weight of the cement, said composition containing no ingredients subversive to high flowability and when mixed with water being capable of flowing under pressure through small voids and interstices without separation or settling.

9. A composition for filling fine voids and interstices of porous masses of earth, rock, masonry, concrete and the like, comprising Portland cement, a finely divided, chemically active siliceous material containing substantial amounts of acidic colloidal silica to retard the gelation of the cement and a suspension stabilizing lubricating agent, said filling material being present in an amount of about one-half to about twice the amount of the weight of the cement, an oleaginous material in an amount up to about 2% of the weight of the cement, said composition containing no ingredients subversive to high flowability and when mixed with water being capable of flowing under pressure through small voids and interstices without separation or settling.

10. A composition for filling fine voids and interstices of porous masses of earth, rock, masonry, concrete and the like, comprising Portland cement, finely ground, water-quenched blast furnace slag in an amount equal to from one to one and one-half times the weight of the cement and ammonium stearate in an amount up to about 2% of the weight of the cement, said composition containing no ingredients which prevent flowability through fine passageways.

11. A composition for filling fine voids and interstices of porous masses of earth, rock, masonry, concrete and the like, comprising finely divided Portland cement, a finely divided filler in amounts of one-half to twice the amount of the cement, and containing substantial amounts of acidic colloidal silica to retard the gelation of the cement, and an oleaginous material in an amount up to 2% of the weight of the cement to increase flowability of the composition, all ingredients of said composition being finely divided so that when mixed with water the material is capable of flowing under pressure through fine voids and interstices without separation or settling.

LOUIS S. WERTZ.